Aug. 25, 1964  L. BALAMUTH  3,145,450
METHOD OF ULTRASONIC REMOVAL OF MATERIAL BY FATIGUE FAILURE
Filed May 23, 1962

INVENTOR.
LEWIS BALAMUTH
BY
ATTORNEY.

3,145,450
METHOD OF ULTRASONIC REMOVAL OF MATERIAL BY FATIGUE FAILURE
Lewis Balamuth, New York, N.Y., assignor to Cavitron Ultrasonics Inc., New York, N.Y., a corporation of New York
Filed May 23, 1962, Ser. No. 197,089
10 Claims. (Cl. 29—81)

This invention relates generally to the ultrasonic removal of material by fatigue failure thereof.

When metal or other parts are machined or ground, surfaces or edges of the parts are left with sharp burrs which have to be removed for safety or comfort in handling such parts, or to avoid scoring or other damage to parts with which the burrs may come in contact. Accordingly, machined or ground parts are usually subjected to final hand finishing operations which involve the use of files, grinding wheels or other abrading tools for removing the burrs. Such finishing operations are time consuming and costly, and are particularly difficult to perform without scratching or marring adjacent finished surfaces when the parts in question have small dimensions or are formed with numerous closely adjacent burrs.

Further, when metal parts are joined together by welds, the weld metal and the contiguous areas of the joined together metal parts are covered by slag which is tenaciously adherent or bonded thereto. The rough textured slag has to be removed prior to the painting, plating or other finishing of the welded structure, and the removal of the slag has heretofore usually been accomplished with chipping hammers or the like which require considerable strength to operate and thus are tiring to the persons effecting removal of the slag.

In each of the above situations, the material to be removed, that is, the burrs or slag, has a substantially lower fatigue strength than the material to which it is bonded, that is, the machined or ground part on which the burrs occur or the weld metal and contiguous areas of the welded together metal parts having the slag bonded thereto, and it is an object of the present invention to provide an improved method by which the material of relatively lower fatigue strength can be conveniently removed.

Another object is to provide a method for the removal of burrs or slag in a rapid manner and with the exertion of a minimum of physical energy by the person effecting such removal.

A further object is to provide a method of the described character which avoids the possibility of damage, such as, scoring, scratching or chipping, of the regions of the metal part or welded structure adjacent the burrs or slag to be removed.

In accordance with an important aspect of this invention, material, such as burrs or slag, bonded to another material of substantially higher fatigue strength is quickly and easily removed from the latter by applying high frequency mechanical vibrations thereto so that the burr, slag or other material to be removed and its bond with the burred part or welded structure disintegrate due to rapid fatigue failure or fracture. The vibrations applied for removal of the burrs or slag may have a frequency in the range between 1,000 and 100,000 cycles per second, preferably at least 10,000 cycles per second, and an amplitude in the range between .0001 and .1 inch, so as to develop extremely high peak accelerations, preferably of the order of at least 1,000 $g$.

The vibrations for effecting removal of the burrs or slag may be applied through hand directed tools of suitable configuration which are interchangeable with other work performing tools in acoustically vibrated material treating devices of the type disclosed in the application for U.S. Letters Patent, Serial No. 758,069, filed August 29, 1958, by Lewis Balamuth, Arthur Kuris and Claus Kleesattel, now U.S. Patent No. 3,076,904, and wherein each work tool is rigidly joined, in end-to-end relationship, to a connecting body or acoustic impedance transformer and to a transducer to form an insert unit or assembly which is removably supported in a housing containing a coil in surrounding relationship to the transducer and receiving a biased alternating current for producing an alternating electromagnetic field.

The above, and other objects, features and advantages of the invention, will be apparent in the following detailed description of illustrative embodiments thereof which is to be read in connection with the accompanying drawing forming a part hereof, and wherein.

Figure 1:
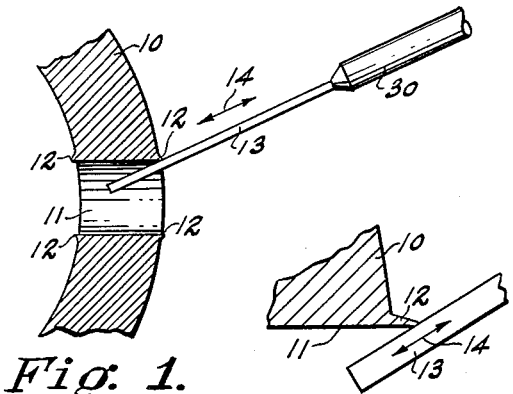
FIG. 1 is a fragmentary view illustrating the removal of a burr extending along an edge of a milled slot or drilled hole of a metal part in accordance with the method embodying this invention.
Figure 2:
FIG. 2 is a greatly enlarged view of a portion of FIG. 1.

Referring to the drawings in detail, and initially to FIGS. 1 and 2 thereof, it will be seen that, when a part 10 of metal or other substantially rigid material has a hole or slot 11 drilled or otherwise machined therein, burrs 12 of relatively small thickness (FIG. 2) are left at the edges of the hole or slot 11. The burrs 12, being of relatively small thickness, have a substantially lower fatigue strength than that of the main body of the part 10 to which the burrs are bonded.

In accordance with the present invention, the burrs 12 are removed from part 10 by applying thereto high frequency mechanical vibrations so that the effect of such vibrations is to disintegrate the burrs 12 and the bond of the latter to the part 10 due to the rapid fatigue failure or fracture thereof. The vibrations necessary to achieve the foregoing have a high frequency within the range between 1000 and 100,000 cycles per second, and preferably of at least 10,000 cycles per second, and an amplitude within the range of .0001 to .1 inch so as to provide high peak accelerations, preferably of the order of at least 1,000 $g$. Peak acceleration is equal to $$4\pi^2 \frac{A}{t^2}$$

in which $A$ is the amplitude and $t$ is 1/frequency. Thus, for example, with a frequency of 20,000 cycles per second and an amplitude of .002 inch, a peak acceleration of approximately 100,000 is obtained.

The vibrations for effecting removal of the burr 12 are preferably applied through a tool 13 of suitable configuration which is vibrated longitudinally, as represented by the arrows 14 on FIGS. 1 and 2, and which is wiped or moved along the burr 12 so that the latter is generally vibrated transversely. Due to the high frequency repetition of bending stresses therein, the burr suffers fatigue failures or fractures at the bond or joint of the burr with the main body of the part 10.

Figure 8:
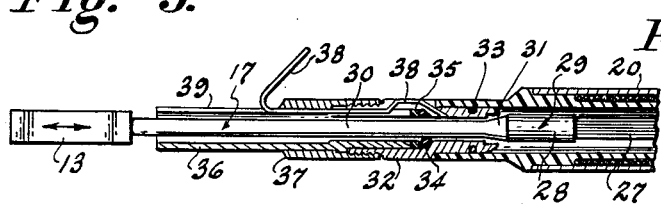
FIG. 8 is a side elevational view, partly broken away and in axial section, of an acoustically vibrated material treating device having one form of tool connected thereto for use in connection with this invention.

As shown in FIG. 8, the device 15 for effecting the necessary high frequency vibrations of the tool 13 may be in the form of a hand piece generally comprising a tubular housing 16 into which an insert unit 17 supporting the tool 13 may be partially telescoped. The housing 16, as in the previously more fully identified copending application Serial No. 758,069, includes a tubular casing 18 preferably formed of molded plastic, such as, nylon or the like, and having an inner wall surface which is relatively smooth and of uniform diameter throughout. A winding 19 of current conducting wire is wound on the outside of casing 18 and is enclosed and protected by an outer jacket 20 which may be formed of extruded plastic tubing. The plastic material of casing 18 does not impede the establishment of an alternating electromagnetic field within the tubular casing upon excitation of the exterior winding or coil 19 by a biassed alternating current supplied to the latter from a suitable generator 21 by way of wire leads 22 housed in a protective flexible conduit 23. Conduit 23 is connected to a nipple portion 24 at one end of casing 18 by an adaptor 25. Conduit 23 also contains a tube 26 by which a coolant may be supplied through nipple 24 to the interior of casing 18.

The insert unit 17 is made up of a mechanical vibrator that includes a transducer 27 designed to be telescoped within casing 18 with winding 19 in surrounding relation thereto. The transducer 27 may be any one of a number of electro-mechanical types, such as, electrodynamic, piezo-electric or magnetostrictive, however, for the operating range of frequencies most desirable for the purposes of the present invention, transducer 27 is preferably of the magnetostrictive type. The magnetostrictive transducer 27 is formed of a metal, such as, Permendur, Permanickel, nickel, or other metals which have high tensile strength and are highly magnetostrictive in character, so that it will vibrate to a maximum degree when subjected to the influence of the alternating electromagnetic field established by the biassed alternating current supplied to winding 19. As shown in FIG. 8, transducer 27 may comprise a stack of strips of the selected magnetostrictive metal secured together at one end, while the other end of the transducer is rigidly fixed, as by brazing solder, to a head 28 of an acoustic impedance transformer generally identified by the reference numeral 29 and also forming part of the mechanical vibrator.

The acoustic impedance transformer or connecting body 29 may be made of a strong metal, such as, steel, Monel metal, titanium, Phosphor bronze, brass or beryllium copper, and further includes a stem 30 integrally joined to the head 28 by a tapered neck 31 and having a length which is selected so that the end of stem 30 projects out of housing 16 when insert unit 17 is in assembled relationship with the latter. The removable insert unit 17 further includes a tubular retainer 32 extending loosely around stem 30 and having a reduced diameter neck dimensioned to telescope snugly into the open end of casing 18. A sealing ring 33 is set within a groove extending around the reduced neck of retainer 32 to provide a liquid seal between the retainer and casing 18. A second resilient ring 34 fits snugly around stem 30 and is driven axially into abutment against an internal shoulder of retainer 32 by a metal ring 35 which fits loosely over stem 30. The portion of stem 30 extending beyond retainer 32 may be protected by a guard member 36 having a throat telescoping snugly into retainer 32 and thus supported by the latter. The protective guard member 36 is held in assembled relation to retainer 32 by means of a sleeve 37 engaging an external shoulder on the guard member and having a threaded connection with the retainer so that, when sleeve 37 is tightened on retainer 32, guard member 36 is drawn axially into retainer 32 and acts, at its inner end edge, against metal ring 35 which is thereby pressed against resilient ring 34 for radially expanding the latter. The ring 34 provides a fluid seal between stem 30 and the bore of retainer 32, and additionally provides the sole support for the mechanical vibrator formed by transformer 29 and transducer 27 at approximately a node of the longitudinal movement thereof so that the vibrations of high frequency and low amplitude are not dampened or transmitted to the housing.

It will be apparent that the entire insert unit 17 may be disconnected from housing 16 by merely exerting an outward pull thereon sufficient to withdraw the reduced neck and associated sealing ring 33 of retainer 32 from the open end portion of casing 18. The entire insert unit may likewise be attached to the housing in a leak-proof manner merely by telescoping the reduced neck and sealing ring 33 of retainer 32 into the end portion of casing 18. Thus, interchangeable insert units constructed in the above described manner and equipped with tools of different kinds and shapes, as hereinafter described in detail, can be quickly applied and removed from the housing to adapt the device 15 for use in the removal of various kinds of material in accordance with the invention.

Since the transducer 27 is subjected to heating after prolonged operation and most effective serves its purpose when maintained in relatively cool condition, the flow of cooling fluid, such as, water or cold air, from tube 23 is directed into the interior of casing 18 containing the transducer, and such flow of cooling fluid also maintains the outer jacket 20 at approximately room temperature so that it can be comfortably grasped. The cooling fluid supplied to the interior of casing 18 is permitted to bleed into the bore of retainer 32 through one or more notches (not shown) in the edge of the reduced diameter neck of the retainer, and is discharged from the bore of retainer 32 through a bent tube 38 which bypasses rings 33 and 34 and then extends outwardly through a longitudinal slot 39 in guard member 36. The discharge tube 38 may have its exposed end connected to flexible tubing (not shown) for carrying the discharged cooling fluid away from the work area.

The transducer 27 and transformer 29 are longitudinally dimensioned so as to have lengths which are whole multiples of half-wavelengths of the compressional waves established therein at the frequency of the biassed alternating current supplied to winding 19 so that longitudinal loops of motion occur both at the connection between the transducer and transformer and at the end of the transformer stem 30 to which the tool 13 is rigidly connected. Thus, the optimum amplitude of longitudinal vibration of tool 13 is achieved, and such amplitude is determined by the relationship of the masses of the head 28 and stem 30 of the transformer which may be made effective to either magnify or reduce the amplitude of the vibrations received from the transducer.

The tool 13 may be in the form of a relatively flat metal strip, as shown in FIGS. 1 and 8, thereby to provide relatively wide surface areas for contact with the burrs or other thin projections of metal to which the vibrations are to be applied for effecting the removal thereof by fatigue failure. The tool 13 may be permanently attached to the end of stem 30, for example, by brazing solder or the like, or the tool may be provided with a threaded stud (not shown) adapted to be screwed into a tapped hole in the end of stem 30 for effecting the rigid connection of the tool to the stem.

Figure 4:
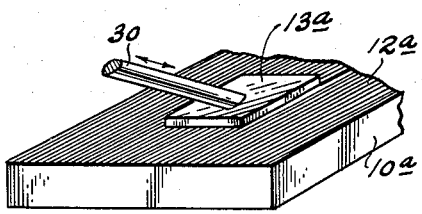
FIG. 4 is a diagrammatic perspective view illustrating the removal, in accordance with the invention, of burrs from the surface of a machine part.

Further, the tool 13 may have its longitudinal axis aligned with the axis of stem 30, as in FIGS. 1 and 8, or the tool, in the form of a flat plate, as at 13a on FIG. 4, may be welded to the end of the stem 30 with the plane of the tool 13a disposed at an angle to the longitudinal axis of the transformer stem. The tool 13a illustrated on FIG. 4 is particularly suited for removing the burrs represented by the lines 12a which remain on a surface of a part 10a after the latter has been subjected to a planing or milling operation.

In removing the burrs 12a from a machined surface of the part 10a, the tool 13a may be disposed so that its direction of vibration extends generally transversely with respect to the burrs 12a, as was the case in the removal of the burr 12 in FIGS. 1 and 2, or the tool 13a can be held so that its direction of vibration extends generally parallel to the burrs 12a, as shown on FIG. 4. In either case, the high frequency vibrations transmitted to the burrs 12a during the movement of tool 13a over the burred surface are effective to cause the rapid fatigue failure or fracture of the burrs and hence the removal of the latter from the part 10a.

Figure 3:
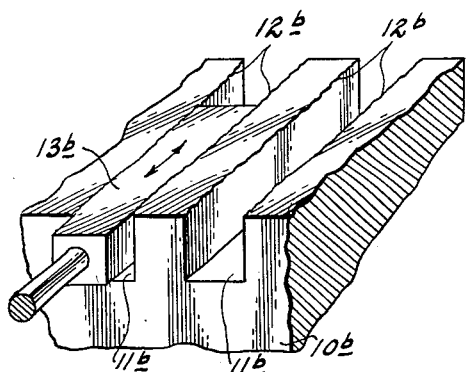
FIG. 3 is a diagrammatic perspective view illustrating the removal, in accordance with the invention, of burrs extending along edges of a series of narrow grooves in a machined or ground part.

Further, in the above description of the method embodying the invention with reference to FIGS. 1 and 2 and FIG. 4, the vibrated tool 13 or 13a has been contacted with the burrs which are to be removed. However, it has been found that burrs of relatively low fatigue strength formed on a part or member of relatively higher fatigue strength may be removed from the latter by high frequency vibrations which are transmitted to the burrs through the part or member on which the burrs occur. Thus, a metal part or member 10b (FIG. 3) having a series of parallel grooves 11b cut in a surface thereof which is thereafter ground to leave burrs 12b extending along the edges of the grooves, may have the burrs removed by wiping a longitudinally vibrated tool 13b along the grooves 11b. The tool 13b may have a thickness substantially corresponding to the width of each groove 11b so that the burrs 12b along the opposite edges of the groove are simultaneously removed. Further, it has been found that, during movement of the vibrated tool along one of the grooves 11b, the vibrations transmitted to the metal part 10b are also effective to cause the fatigue failure, and hence removal, of burrs extending along the edges of adjacent grooves.

Figure 6:
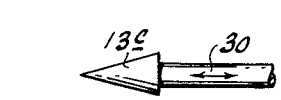
FIG. 6 is a detail view of another tool that can be used in accordance with the invention.

In the above described embodiments of the invention, the vibrated tool employed for effecting removal of burrs has been in the form of a metal strip or plate having flat surfaces and being generally of rectangular configuration. However, vibrated tools having various other shapes can be employed. More specifically, the tools 13, 13a and 13b can be formed with curved or pointed end edges. Further, as shown in FIG. 6, a conical tool 13c may be provided which is particularly suited for use in removing burrs from the end edges of bored or drilled holes.

Figure 7:
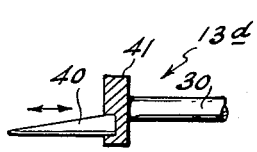
FIG. 7 is a view similar to that of FIG. 6, but showing another form of tool.

When it is desired to avoid scratching or marring of finely finished surfaces during the removal of burrs from the edges thereof, the high frequency vibrations for effecting fatigue failure or fracture of the burrs may be applied through the tool 13d illustrated in FIG. 7, which tool includes a tapering length 40 of orange stick or other hard wood adhesively or otherwise secured at one end in a head 41 rigidly mounted on the end of the transformer stem 30.

Figure 5:
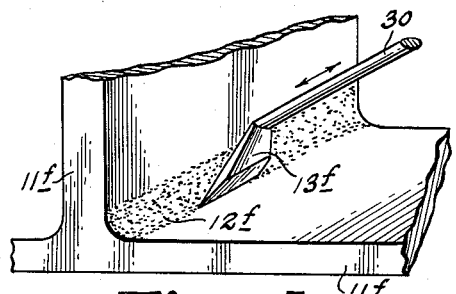
FIG. 5 is a diagrammatic perspective view illustrating the removal, in accordance with the invention, of slag from the weld area of a welded metal structure.

Although the previously described embodiments of the invention have all involved the removal of burrs from machined metal or other hard materials, it is apparent that the method embodying the invention may be employed for removing any other material of relatively low fatigue strength bonded to a supporting body or structure of higher fatigue strength, whether of the same material or of a different material. Thus, flashings or flues can be removed from die cast metal parts. Further, as illustrated in FIG. 5, vibrations applied through a tool 13f may be used for removing slag from a welded joint 12f securing together metal structural parts 11f. The tool 13f used for the removal of slag may have a trowel-like configuration tapering in thickness toward its free end. The vibrations of the transformer stem 30 transmitted through the tool 13f to the slag covering the welded joint 12f and the adjacent areas of the metal parts 11f are effective to cause fatigue failure of the slag and of the bond of the latter to both the weld metal and the metal of parts 11f.

Although illustrative embodiments of the invention have been described in detail herein with reference to the accompanying drawing, it is to be understood that the invention is not limited to those precise embodiments, and that various changes and modifications may be effected therein without departing from the scope or spirit of the invention, except as defined in the appended claims.

What is claimed is:

1. A method for removing material of relatively low fatigue strength bonded to a body of relatively higher fatigue strength comprising applying mechanical vibrations at a frequency in the range between 1000 and 100,000 cycles per second and with an amplitude selected from the range between .0001 and .1 inch to provide peak accelerations of at least 1000 g to said material for a time sufficient to effect fatigue fracture of said material and of the bond of the latter to said body.

2. A method as in claim 1; wherein said vibrations are applied directly to said material to be removed.

3. A method as in claim 1; wherein said vibrations are applied to said material through said body.

4. A method as in claim 1; wherein said body is of the same material as said material to be removed and the relatively low fatigue strength of the latter results from the thinness thereof.

5. A method as in claim 1; wherein said body is of a material different from said material to be removed.

6. A method as in claim 1; wherein said material to be removed is constituted by burrs on said body.

7. A method as in claim 1; wherein said material to be removed is constituted by welding slag covering a welded joint of said body.

8. A method for removing a portion of relatively low fatigue strength from a body of relatively higher fatigue strength to which said portion is bonded, comprising effecting mechanical elastic vibration of a non-abrasive tool member at a frequency in the range between 1000 and 100,000 cycles per second and an amplitude selected from the range between .0001 and .1 inch to provide peak accelerations of said tool member of at least 1000 g, and manually applying said vibrated tool member against said body so as to transmit said vibrations to said portion for a time sufficient to effect fatigue fracture of said portion and of the bond of the latter to said body.

9. A method as in claim 8; wherein said vibrated tool member is contacted directly with said portion of the body.

10. A method as in claim 8; wherein said vibrated tool member is contacted with said body at a location spaced from said portion, so that the vibrations are transmitted to the latter through said body.

References Cited in the file of this patent

UNITED STATES PATENTS

| | | |
|---|---|---|
| 2,118,480 | Somes | May 24, 1938 |
| 2,356,314 | Gray | Aug. 22, 1944 |
| 2,445,934 | Bodine | July 27, 1948 |
| 2,606,410 | Thery | Aug. 12, 1952 |
| 2,716,392 | Wieck | Aug. 30, 1955 |

FOREIGN PATENTS

| | | |
|---|---|---|
| 978,290 | France | Nov. 22, 1950 |